Nov. 28, 1967    P. P. PARADISSIS    3,355,653
VARIABLE PULSE WIDTH REGULATED POWER SUPPLY
Filed Feb. 4, 1964    3 Sheets-Sheet 1

INVENTOR.
BY PANTELIS P. PARADISSIS
Willis L. Vary
ATTORNEY

Nov. 28, 1967   P. P. PARADISSIS   3,355,653
VARIABLE PULSE WIDTH REGULATED POWER SUPPLY
Filed Feb. 4, 1964   3 Sheets-Sheet 2

INVENTOR.
PANTELIS P. PARADISSIS
BY
Willis L. Vary
ATTORNEY

INVENTOR.
PANTELIS P. PARADISSIS
BY
*Willis L. Vary*
ATTORNEY

United States Patent Office 3,355,653
Patented Nov. 28, 1967

3,355,653
VARIABLE PULSE WIDTH REGULATED POWER SUPPLY
Pantelis P. Paradissis, Lorain, Ohio, assignor to Lorain Products Corporation, a corporation of Ohio
Filed Feb. 4, 1964, Ser. No. 342,434
10 Claims. (Cl. 321—2)

ABSTRACT OF THE DISCLOSURE

A variable pulse with type power supply includes a pair of controlled rectifiers, each connected to one terminal of a primary winding of a transformer and a direct current source and alternately fired by a signal fed to the respective controlled rectifier gates. The gates are fired by pulses from an oscillator circuit fed through a pair of differentiating circuits. The pulse duration of the output pulses of the rectifiers is controlled by a circuit which receives a synchronizing signal from the output of the transformer. The controlled rectifiers are quickly and accurately turned off to regulate the output pulse width and therefore the output power in response to variations in input and/or output. This is accomplished by a commutating circuit including a third controlled rectifier and a pair of commutating capacitors, each capacitor being connected in parallel with respective controlled rectifiers by the firing of the third controlled rectifier to supply a reverse voltage across the pair of controlled rectifiers thereby accurately turning off the conducting one of the pair of controlled rectifiers. The power supply includes a "soft start" circuit which for a brief initial period, fires or activates the commutating controlled rectifier almost immediately after either of the power transmitting controlled rectifiers fires, thus providing slow build-up of the power in the power supply.

---

An object of this invention to provide an improved variable pulse width power supply capable of providing millisecond and even microsecond regulated output which is variable over a wide range of output potentials.

Another object of this invention is to provide a closely regulated semi-conductor power supply which converts direct current to alternating current and optionally to direct current having a wide range of output potentials.

A further object of this invention is to provide an improved, closely regulated controlled rectifier type power supply.

Still another object of this invention is to provide an improved variable pulse width solid state power supply.

Yet another object of this invention is to provide a variable pulse width, high power, regulated output semi-conductor power supply which dissipates little power in the output circuit when converting from direct current to alternating current and/or to direct current.

Another object of this invention is to provide a closely regulated, solid state, power supply with a number of outputs which may be either alternating or direct current outputs which have precision response and are relatively insensitive to input potential variations.

It is a still further object of this invention to provide a silicon controlled rectifier inverter which generates a quasi-squarewave from a direct current source and employs a unijunction oscillator as a control device to control the output frequency of the generator, which oscillator is variable over a broad frequency range to provide a power source with a closely regulated output frequency insensitive to variations of the potential of the direct current source.

Still another object of this invention is to provide a parallel type silicon controlled rectifier pulse generator with a circuit for rapidly responding to load variations and turning off the conducting controlled rectifier and thus accurately controlling the pulse duration of the generated pulse.

A still further object of this invention is to provide a parallel type controlled rectifier pulse generator of a converter system with a "soft start" circuit which advances each turn-off pulse for the controlled rectifiers for a number of cycles after direct current power is applied to the system to cause a relatively slow build-up of power in the output circuit and thus prevent damage to the system components.

Still another object of this invention is to provide a regulated power supply with a pair of controlled rectifiers, a pair of commutating capacitors, each connected to be charged through one of the rectifiers and a "soft start" circuit which advances each turn-off pulse for the rectifiers for a brief period after power is applied to permit the use of relatively small commutating capacitors, thus improving the starting characteristics, particularly with no load or light loads, and increasing the operating efficiency.

Briefly, in accordance with aspects of this invention, a power supply of the variable pulse width type is provided with a pair of controlled rectifiers, each connected to one terminal of a primary winding of a transformer and alternately fired by a signal fed to the respective gates from, in the embodiment shown, an oscillator circuit through a pair of differentiating circuits. The pulse duration of the output pulses of the rectifiers is controlled by a circuit which receives a feedback signal from the load and which receives a synchronizing signal from the output of the transformer. In accordance with aspects of this invention, the controlled rectifiers are quickly and accurately turned off in response to variations in input and/or output to vary pulse width. This is accomplished, in the preferred embodiment of the invention, by means of a turn-off circuit including a third controlled rectifier and a pair of commutating capacitors, each capacitor being connected across a respective controlled rectifier by the firing of the third controlled rectifier to apply a reverse voltage across the pair of controlled rectifiers thereby accurately turning off the conducting one of the pair of controlled rectifiers.

In accordance with still other aspects of this invention, the power supply includes a pair of power transmitting controlled rectifiers, a controlling controlled rectifier connected to the power transmitting controlled rectifiers to control the turn-off thereof and a "soft start" circuit which fires or activates the controlling controlled rectifier almost immediately after either of the power transmitting controlled rectifiers fires, thus providing slow build up of the power in the power supply.

In accordance with still further aspects of this invention, the pair of controlled rectifiers is alternately fired from an oscillator circuit, the frequency of which may be closely regulated over a wide range of frequencies by a frequency controlling oscillator circuit. Thus the system is suitable for alternating current outputs, i.e., operation as an inverter, particularly when it is desired to maintain the frequency of the alternating current within a narrow range.

These and various other objects and features of the invention will be more clearly understood from a reading of the detailed description of the invention in conjunction with the drawing in which.

Figure 1:
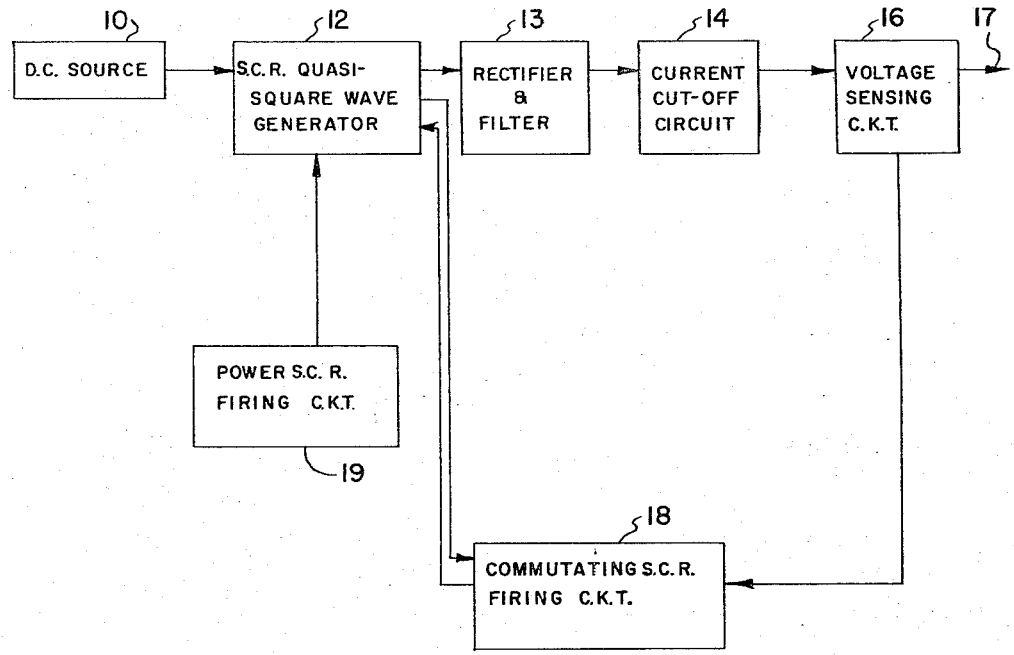
FIGURE 1 is a block diagram showing the functional units of one illustrative embodiment of this invention.

Referring now to FIGURE 1, there is depicted in block form one illustrative embodiment of converter according to this invention. As therein depicted, a source of direct current power 10 is connected to power controlled rectifier quasi-squarewave generator stage 12. The term "quasi-squarewave" refers to a wave having alternate positive and negative substantially square pulses with an intermediate zero step. The output of the quasi-squarewave generator stage 12 is fed through a fullwave rectifier and filter stage 13 to a current cut-off circuit 14 which limits the direct current fed to the load. The output of the current cut-off circuit 14 is fed through a voltage sensing circuit 16 to an output terminal 17, which output is in the form of closely regulated direct current. The voltage sensing circuit compares a portion of the output voltage to a reference voltage and it feeds the error signal to a commutating controlled rectifier firing circuit 18 which includes a pulse generator and synchronizing circuit. The output of firing circuit 18 controls the commutation of the power controlled rectifiers to control the pulse width of the quasi-squarewave generator 12 and thereby control the output power delivered to output terminal 17. The power controlled rectifiers of quasi-squarewave generator stage 12 are controlled by a firing circuit 19 which controls the frequency of quasi-squarewave generator 12 by delivering control pulses to the control electrodes of the power transmitting controlled rectifiers in a manner which will be subsequently described.

Figure 2:
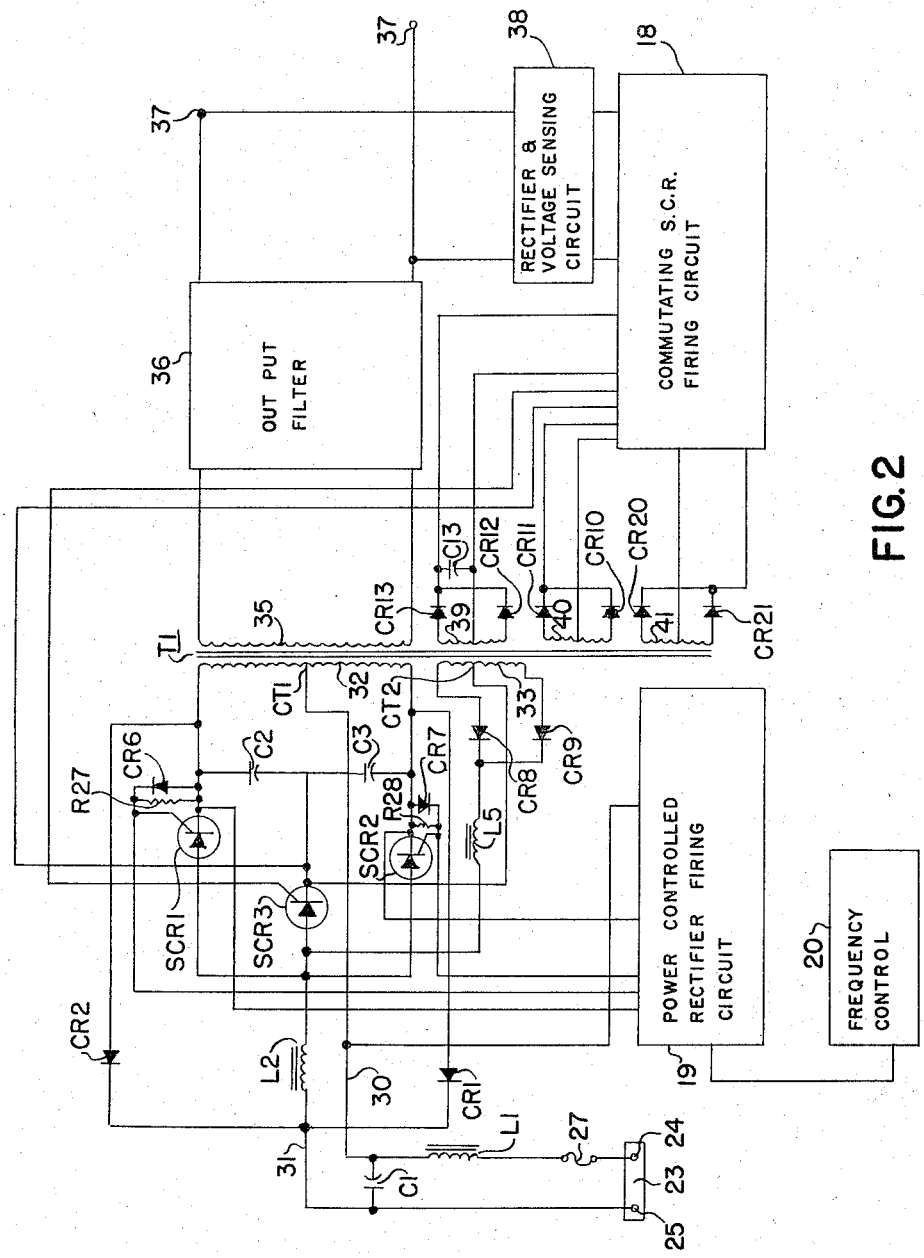
FIGURE 2 is a schematic and block representation of another embodiment of the invention.

FIGURE 2 shows, in schematic and block form, an alternative embodiment of the supply of FIGURE 1 for providing an alternating current output which has a closely regulated frequency. Firing circuits for controlled rectifiers such as firing circuit 19 are subject to change in frequency with variations in applied potential. If, however, a frequency control circuit 20, preferably in the form of a stabilizing oscillator, is connected to act as a triggering device for firing circuit 19, the frequency of firing circuit 19 and thus generator 12 will be stabilized and this frequency may be regulated over a wide range of frequencies by varying the frequency of control circuit 20.

In FIGURE 2, direct current source 10 includes a battery 23 having negative and positive terminals 24, 25, respectively. Source 10 includes a filter circuit defined by a series inductance L1 and a shunt capacitance C1, the inductance L1 being connected to the negative battery terminal 24 by means of a fuse 27. The output of filter L1, C1 is fed over leads 30, 31 to a center tap CT1 of a primary winding 32 of a transformer T1 and an inductance L2, respectively, in the quasi-squarewave generator stage 12. This quasi-squarewave generator 12 includes a group of three controlled rectifiers which may be silicon controlled rectifiers and designated SCR1, SCR2, and SCR3. SCR1 and SCR2 are power handling controlled rectifiers and SCR3 is the commutating or controlling controlled rectifier for SCR1 and SCR2. The cathodes of SCR1 and SCR2 are connected to separate terminals of primary winding 32. These controlled rectifiers are selectively triggered or rendered conducting to form a quasi-squarewave output signal in the primary winding 32 in a manner which will be subsequently described. The anodes of SCR1, SCR2 and SCR3 are connected to inductance L2. A pair of commutating capacitors C2 and C3 is connected between the cathodes of SCR1 and SCR2 and the cathode of SCR3 is connected intermediate this pair of capacitors. SCR1, SCR2 and SCR3 are each triggered by the application of power pulses to the respective gates. SCR1 and SCR2 are alternately fired by pulses from power controller rectifier firing circuit 19 to generate half cycles and SCR3 is fired each half cycle to turn off or "commutate" whichever of SCR1 or SCR2 is conducting by connecting capacitor C2 across the anode and cathode of SCR1 and connecting C3 across the cathode and anode of SCR2. Because the conducting power controlled rectifier is reverse biased by the respective capacitor C2 or C3, current ceases to flow through the previously conducting SCR1 or SCR2, and neither SCR1 nor SCR2 will conduct again until a power pulse is applied to the respective gate. The diodes CR6, CR7 are protecting devices which prevent reverse voltages being applied between the gates and cathodes of SCR1, SCR2, respectively.

The power for SCR3 is derived from a secondary winding 33 of transformer T1 which feeds a pair of rectifiers CR8, CR9 connected for fullwave rectification and connected through an inductance L5 to the anode of SCR3. The center tap CT2 of winding 33 is connected to the cathode of SCR3. Inductance L5 limits the flow of current through SCR3 so that SCR3 is not damaged. SCR3 shuts off when the voltage on winding 33 of transformer T1 goes to zero. The purpose of SCR3 is to turn off whichever of SCR1 or SCR2 is conducting and thus control the pulse duration of the quasi-squarewave pulses applied to the primary winding 32 of transformer T1. The output power of the power supply is regulated by closely controlling SCR3 and thus closely controlling the pulse duration and therefore the power on winding 32.

The firing of SCR1 effectively connects the battery applied to terminals 24, 25 across one-half of the primary winding 32 through inductance L2, causing a substantially square pulse across the primary winding 32. Similarly, when SCR2 fires after SCR1 is turned off by SCR3, the battery applied to terminals 24, 25 is connected through inductance L2 and SCR2 across the other half of the primary winding 32. This alternating of the connection of the battery across the halves of primary winding 32 with an intermediate off period causes a quasi-squarewave to be generated in the halves of the primary winding 32.

The quasi-squarewave on the primary winding induces an alternating current in an output winding 35, which current is supplied through an output filter 36, such as a band-pass filter, to a pair of output terminals 37. A feedback signal is developed in a rectifier and voltage sensing circuit 38 which is connected to terminals 37 and delivers a direct current feedback signal indicative of potential across terminals 37 to the commutating controlled rectifier firing circuit 18.

Transformer T1 includes three output windings 39, 40 and 41 connected to commutating controlled rectifier circuit 18. Winding 39 supplies power to firing circuit components through diodes CR12, CR13 and across filter capacitor C13. This power is employed to bias certain semi-conductors and to charge a frequency controlling capacitor. Winding 40 supplies synchronizing pulses through diodes CR10, CR11 to synchronize the output pulses of firing circuit 18 with the pulses supplied to the primary winding 34 of transformer T1. Winding 41 supplies cut-off biasing pulses through diodes CR20, CR21 to a semi-conductor in firing circuit 18. The details of the function of these output signals from windings 39, 40 and 41 will be subsequently described in conjunction with FIGURE 3.

Figure 3:
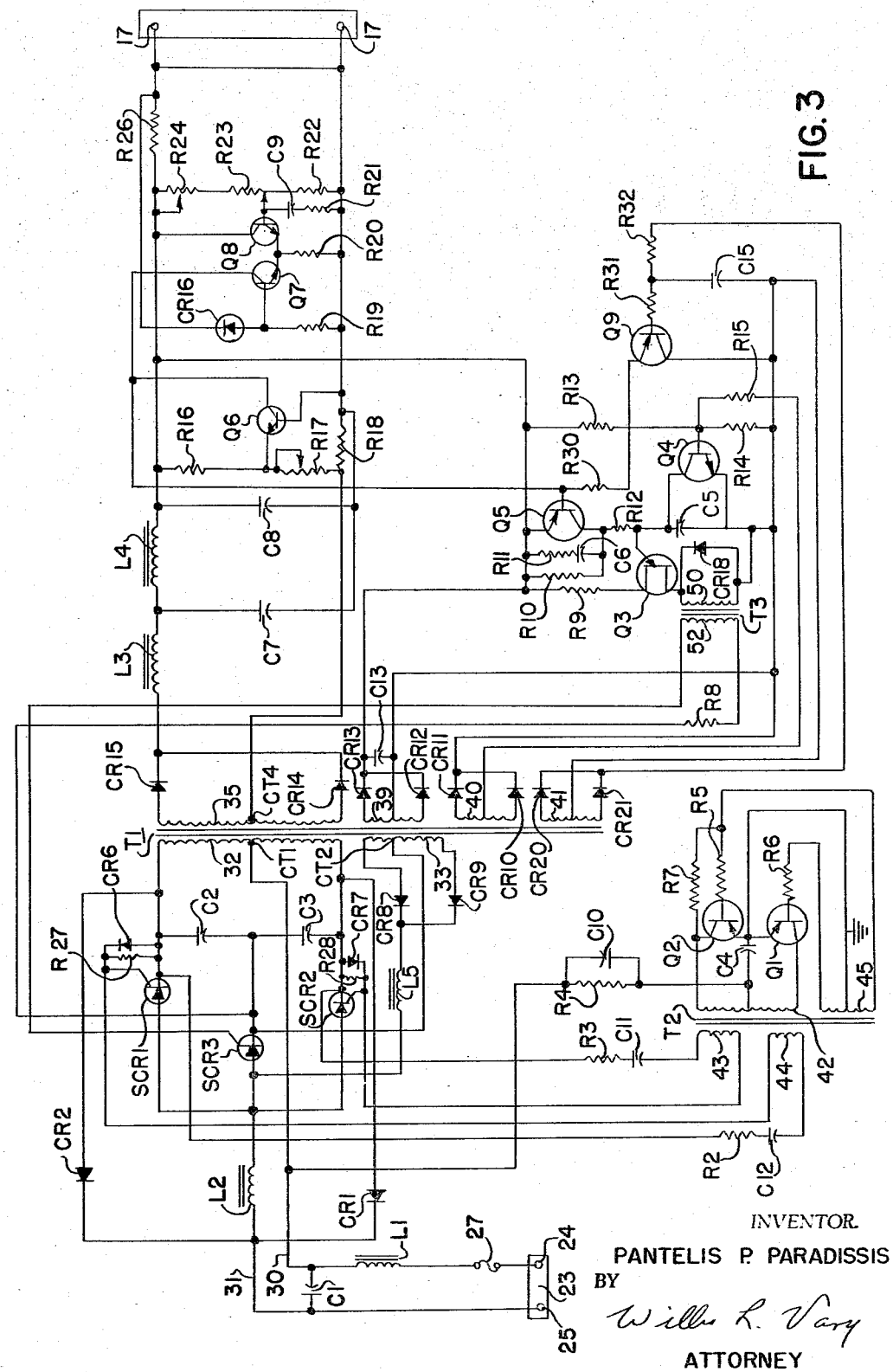
FIGURE 3 is a schematic representation of the embodiment of FIGURE 1.

FIGURE 3 shows schematically the embodiment of FIGURE 1 which includes the previously described schematic portion of FIGURE 2. In this embodiment, power controlled rectifier firing circuit 18 includes a pair of transistors Q1, Q2 connected to a primary winding 42 of a saturable core transformer T2 to define a square-wave oscillator. A pair of output windings 43, 44 is connected through respective differentiating circuits R2, C12 and R3, C11 to the cathodes and control electrodes of SCR1 and SCR2, respectively. The collector electrodes of transistors Q1 and Q2 are connected to opposite terminals of primary winding 42 and the center tap terminal CT3 of winding 42 is connected through a parallel resistance-capacitance network including resistor R4 and capacitor C10 to the negative terminal lead 30 from the direct current source 10 to supply suitable collector bias. The emitters of Q1 and Q2 are connected together and coupled to the center tap CT3 of primary winding 42 through a filter capacitor C4. A feedback winding 45 is included on the saturable core of transformer T2 to feed back energy to the respective bases of transistors Q1, Q2 through resistors R6, R5, respectively. A suitable resistor R7 is shown connected to the collector electrode of transistor Q2 and to the opposite end of R5 to provide a forward bias for the transistor Q2 in a manner well known in the art. The output of squarewave oscillator semi-conductors Q1, Q2 is alternately fed through secondary windings 43, 44 through the respective differentiating circuits R2, C12 and R3, C11 to the gates of SCR1, SCR2, alternately, to fire these silicon controlled rectifiers. The rapidity with which the power supply responds to changes in the output circuit depends on the frequency of firing circuit 19. If this frequency is of the order of kilocycles, then the rapidity of response is of the order of microseconds. Because of the operation of these differentiating circuits, sharp pulses of short duration are fed to the gates of SCR1 and SCR2 to trigger or fire the power controlled rectifiers into successive conductivity. Commutating rectifier SCR3 is fired once for each output pulse on winding 32 by firing circuit 18 in a manner which will be subsequently described. The triggering of SCR3 controls the pulse width of the input quasi-squarewave to the primary winding 32 of transformer T1 and thereby regulates the output voltage on the secondary winding 35 of transformer T1.

The output of winding 35 is connected through a pair of rectifiers CR14, CR15 connected for fullwave rectification to the filter circuit 13 which includes inductances L3, L4 connected in series and shunt capacitors C7, C8 which may be electrolytics. The opposite terminals of capacitors C7, C8 are connected to a base electrode of a current cut-off circuit transistor Q6. The cut-off circuit includes a resistor R18 connected to the center tap CT4 of secondary winding 35. The current cut-off circuit includes a resistor R16 connected to the emitter electrode of transistor Q6 and a variable resistor R17 connected between the emitter electrode of Q6 and resistor R18. The collector electrode of transistor Q6 is connected to the collector electrode of a transistor Q7 which forms part of a differential amplifier including transistors Q7 and Q8, which differential amplifier acts as a voltage sensing circuit in a manner which will be subsequently described.

The voltage sensing circuit 16 includes transistors Q7, Q8 connected as a differential amplifier through their associated components, CR16, R19, R20, R24, R23, R22 and R26. Resistors R22, R23 and R24 are a voltage divider arrangement across the output terminals of the filter section and variations in the output voltage of the filter section will be applied across this voltage divider network. When a positive increment of voltage occurs at a very short interval, i.e., of the order of milliseconds, or even microseconds, the voltage increment occurs in a direction to cause the base of transistor Q8 to become more negative. Because of the circuit configuration of Q7, Q8 with R20 as the common emitter resistance, a constant current flows through R20 and, if the base of transistor Q8 becomes more negative, less current flows through transistor Q8 and more current flows through transistor Q7. When the current through Q7 increases, the pulse width controlling controlled rectifier SCR3 is fired or activated to turn off the conducting controlled rectifier SCR1 or SCR2 sooner in the cycle thereby decreasing the pulse width and the resulting power on winding 32 in a manner which will be subsequently described.

The pulse commutating controlled rectifier firing circuit 18 includes transistors Q3, Q5 which act as a firing circuit for SCR3. At any period in the cycle after the firing of either SCR1 or SCR2, SCR3 can be fired by Q3 to turn the then conducting SCR1 or SCR2 off. The output of firing circuit 18 is controlled, in part, by the potential developed in the voltage sensing circuit between the collector of transistor Q7 and the collector of transistor Q8.

Transistor Q3 is a unijunction transistor connected in a relaxation oscillator circuit including the primary winding 50 of a transformer T3, a diode CR18 connected in parallel with the primary winding 50 of T3 to bypass pulses of one polarity and thus prevent reverse pulses on the gate of SCR3. The power for this relaxation oscillator circuit is derived from the secondary winding 39 of transformer T1 and fed through rectifiers CR12, CR13 connected for fullwave rectification and a filter including capacitor C13. A center tap CT5 of winding 39 is connected to primary winding 50 of transformer T3. Diodes CR12, CR13 are also connected to the emitter electrode of transistor Q5. Transistor Q5 is connected in the charging circuit of capacitor Q5 and acts as a variable resistance to control the charging rate of C5 in accordance with the signal applied to its base. When more current flows through transistor Q7, the base of transistor Q5 becomes more negative, making transistor Q5 conduct more current. When transistor Q5 conducts more current, this current flows through resistor R12 and charges capacitor C5 at a faster rate than previously. This increased charging rate of C5 causes Q3 to conduct earlier in the squarewave cycle developed in firing circuit 19 and to deliver an output pulse through T3. This pulse on primary winding 50 of transformer T3 is induced into the secondary winding 52 of T3 and applied through a resistor R8 to the cathode and directly to the gate of SCR3. This pulse on the gate of SCR3 causes it to conduct and turn off the respective conducting SCR1 or SCR2 sooner in the cycle. Turning off SCR1 and SCR2 sooner in their respective cycles reduces the pulse width of the positive and negative portions of the quasi-squarewave and thereby reduces the root means square voltage applied to primary winding 32 of transformer T1 which results in a decrease in the output voltage on the secondary winding 35 of T1 and thus regulates the output potential from the filter as applied to the load. This process may be accomplished in the order of microseconds.

Another feature of this invention is a current cut-off circuit in which regulation takes place when the load current exceeds a predetermined value. When load current exceeding a predetermined value flows through resistor R18, transistor Q6 conducts. Because the collector electrode of Q6 is also connected to the base of Q5, conduction of Q6 causes the base of transistor Q5 to become more negative. This causes transistor Q5 to conduct more current and causes capacitor C5 to charge earlier in the cycle. This operation, charging C5 earlier in the cycle, reduces the width of the quasi-squarewave supplied to primary winding 32 of transformer T1, thereby reducing the voltage on the output winding 35 in a manner previously described with respect to output voltage control. The transistor Q6 actually operates on a difference in potential developed across R17 and R18. Resistor R18 has a very low resistance, for example, .1 ohm in a 15 ampere power supply and carries the load current to the output terminals and therefore reflects variations in the output load current but dissipates very little power.

The unijunction oscillator circuit including Q3 is of the type well known and one example of this type of oscillator circuit is shown in GE "Silicon Controlled Rectifier Manual," Second edition, page 46. In the operation of the circuit of this invention, however, regulation has been added by means of transistor Q5. The unijunction transistor circuit includes a series resistor R12 which limits the current to the emitter of Q3 and therefore protects Q3. R12 also acts to limit the phase angle of SCR3 and prevents this phase angle from going to zero. This arrangement prevents SCR3 from firing simultaneously with SCR1 or SCR2. Resistor R10 is connected between the emitter and collector electrodes of transistor Q5 to prevent the effective impedance of this transistor from exceeding a predetermined value. If the impedance in the charging circuit of Q5, which circuit includes resistor R10 and transistor Q5, were too high it would be impossible to initiate the firing of SCR3 to limit the pulse duration of the quasi-squarewave and thereby regulate the output power. Thus the insertion of the resistor R10 in parallel with the capacitor charging rate control transistor Q5 assures adequate control of the firing of SCR3.

For the proper operation of the system, the pulse generator portion of circuit 18 must be synchronized with the squarewave oscillator which includes transistors Q1 and Q2. This may be accomplished in any one of a number of ways, two of which will be described. Transistor Q4 has its emitter and collector electrodes connected to opposite electrodes of capacitor C5 and its base electrode connected to a voltage divider including resistors R13 and R14, which normally bias transistor Q4 so that Q4 conducts and prevents C5 from charging. The base electrode is also connected through a resistor R15 to the center tap of a secondary winding 40 of transformer T1. Accordingly, Q4 receives pulses from quasi-squarewave generator 12 through winding 40. The synchronizing circuit includes a pair of rectifiers CR10, CR11 connected for fullwave rectification and these rectifiers apply negative rectifier pulses from winding 40 through resistor R15 to the base of transistor Q4. Each time that transistor Q4 has a negative pulse applied to its base, Q4 is turned off and capacitor C5 begins to charge. After C5 has charged to the threshold voltage of Q3, Q3 fires and generates an output pulse at primary winding 50 of transformer T3. This output pulse is applied through secondary winding 52 of transformer T3 to SCR3, firing SCR3 and turning off whichever of SCR1 or SCR2 was conducting in the manner previously described. Because the quasi-squarewave applied to transformer T1 is controlled by the squarewave oscillator of firing circuit 19, the pulse generation of transistor Q3 is synchronized with the squarewave oscillator of firing circuit 19. The pulse generation of transistor Q3 has to be synchronized with firing circuit 19 to prevent erratic firing of SCR3.

FIGURE 3 includes a second, or alternative, synchronizing circuit which may be provided by removing resistors R13, R14 and R15, transistor Q4, winding 40 and diodes CR10, CR11 and by removing capacitor C13 from the output of diodes CR12, CR13 connected to secondary winding 39 of transformer T1. A rectified squarewave is applied to the oscillator circuit which includes transistor Q3 through resistors R10, R12. Capacitor C5 starts charging at the leading edge of the rectified squarewaves, thus synchronizing the pulse generator portion of circuit 18 with firing circuit 19 (FIGURE 1).

To protect the components of the system and to permit the use of smaller commutating capacitors C2, C3, a "soft start" circuit is employed. This "soft start" circuit causes voltages to build up relatively slowly throughout the system. This circuit includes transistor Q9; resistors R31, R32; capacitor C15 and secondary winding 41 of transformer T1. When starting the system, Q9 is fully conducting, its base being negative relative to its emitter. The base electrode is tied to the negative terminal of the supply defined by rectifiers CR20, CR21 and secondary winding 41, the rectifiers being connected for fullwave rectification of the feedback signal to firing circuit 18 (FIGURE 1) from generator 12. When Q9 is conducting, the base of transistor Q5 is effectively tied to the negative terminal of the oscillator supply through R30 and the emitter-collector of Q9, thus Q5 conducts fully. Because Q5 is fully conducting, C5 charges very early in the cycle, Q3 fires early in the cycle and SCR3 is triggered early in the cycle thus turning off SCR1 and SCR2 early in the cycle and thereby causing low power to be delivered to secondary 35. Resistor R32 and capacitor C15 act as a delay circuit to delay the cut-off biasing of transistor Q9 from transformer winding 41 until the output potential has had an opportunity to build up slowly. The output voltage of winding 41, which energizes transistor Q9, must be greater than the output voltage of winding 39 which energizes the unijunction transistor Q3. When capacitor C15 charges up to its peak voltage, the base of Q9 becomes more positive with respect to its emitter and Q9 stops conducting and the remainder of the firing circuit 18 operates in a manner previously described. The "soft start" circuit thus causes the quasi-squarewave pulses on the primary winding 32 of transformer T1 to be very narrow upon starting which results in the output voltage on secondary winding being relatively low. Thus, capacitors C7 and C8 will charge slowly because they are receiving charging current at a relatively low rate.

Figure 4:
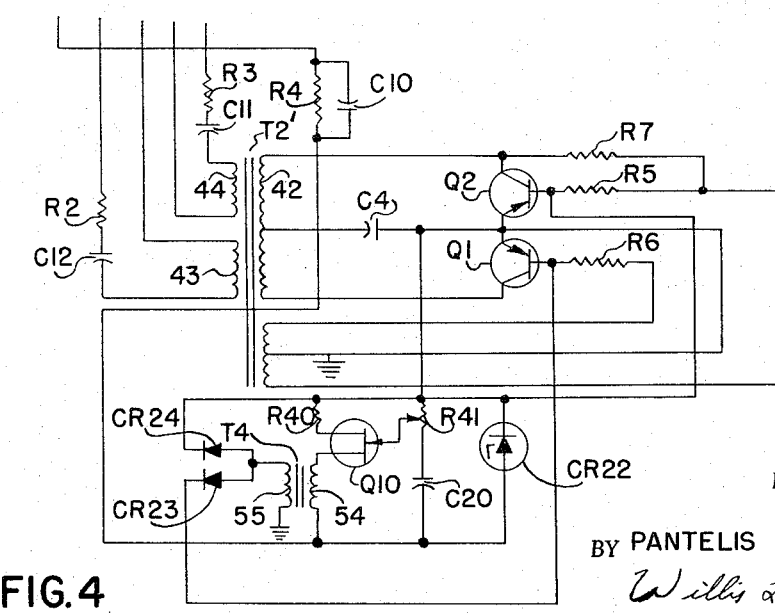
FIGURE 4 is a schematic representation of one embodiment of the frequency control circuit and the power silicon controlled rectifier firing circuit of FIGURE 2.

When it is desired to use this system as the inverter shown in FIGURE 2, the modifications shown schematically in FIGURE 4 are made. Also, output winding 35 of transformer T1 is connected through an output filter 36 to output terminals 37 and a rectifier and voltage sensing circuit 38 is connected between terminals 37 and firing circuit 18. It is usually important that an alternating current load be fed from a source of alternating current, the frequency of which is closely regulated. In order to closely regulate the frequency of this system, a unijunction oscillator circuit 20 (FIGURE 2) is provided which is insensitive to temperature and applied potentials. This oscillator is coupled to the squarewave oscillator firing circuit 19 to closely control the frequency of the squarewave oscillator Q1, Q2 and thus closely control the output frequency as fed to secondary winding 35 of transformer T1. This oscillator circuit includes unijunction transistor Q10, resistor R40, variable resistor R41 connected to one of the bases and the emitter, respectively, transformer T4 having a primary winding 54 connected to the other base of Q10, a capacitor C20 connected between the emitter and winding 54 and Zener diode CR22 connected across R41 and C20. Feedback is provided through transformer T4, secondary winding 55 and a pair of diodes CR23, CR24. In this particular embodiment, transformer T2' is not operated as a saturable transformer. Transistor Q10 and its associated components are arranged to oscillate at a frequency of twice the frequency which is desired to be fed to the alternating current output terminals 37. When an output pulse is delivered through transformer T4, positive pulses are fed through diodes CR23, CR24 to the bases of transistors Q1, Q2 and these positive pulses will turn off whichever of the transistors Q1 or Q2 is then conducting. The effect of the turn-off of the transistor Q1 or Q2 is to reverse the pulse delivered to the quasi-squarewave generator to the primary winding 32 of the transformer which thus produces an output signal of a predetermined frequency at the secondary winding 35. At the end of the next half cycle, Q10 again delivers a positive output pulse through diodes CR23, CR24 and shuts off transistor Q1 before transformer T2 has had an opportunity to saturate. Because of the presence of Zener diode CR22 across the transistor Q10, the voltage across this pulse generator will be constant for all values of input voltages. Thus, the output frequency of the unijunction oscillator 20 will remain constant and provide a constant output frequency for all values of input potential. The output frequency of oscillator 20 may be changed to any one of a wide range of values by varying R41. Increasing R41 decreases the frequency and vice versa.

While I have shown and described certain illustrative embodiments for the best practicing of this invention, it is understood that the concepts thereof may be applied to other embodiments without departing from the spirit and scope of this invention.

What is claimed is:
1. A regulated power supply comprising:
   direct current input means;
   quasi-squarewave generator means including a pair of semi-conductor switches connected to receive current from said direct current input means for generating a quasi-squarewave therefrom, a pair of commutating capacitors serially connected between said switches and a commutating switch connected to said pair of switches and intermediate said capacitors;

current control means connected to the output of said quasi-squarewave generator means;

pulse generator means connected between said current control means and said commutating switch to receive a signal from said current control means indicative of the current flowing therethrough and for regulating the duration of conduction of said switches by actuating said commutating switch;

oscillator means connected to said switches for alternately rendering said switches conducting thereby causing said quasi-squarewave generator to generate alternate spaced positive and negative pulses;

frequency regulator means connected to said oscillator means for regulating the frequency thereof; and alternating current output means coupled to said quasi-squarewave generator.

2. A regulated power source comprising:
direct current input means;
a transformer having a primary winding and a plurality of output windings;
a first, a second, and a third controlled rectifier each having a cathode, an anode and a gate, said first and said second rectifiers having their cathodes connected to said primary winding;
an inductance connected between said direct current input means and the anodes of each of said controlled rectifiers;
a first commutating capacitor connected between the cathodes of said first and third controlled rectifiers;
a second commutating capacitor connected between the cathodes of said second and said third controlled rectifiers;
first oscillator means connected to the gates of said first and said second controlled rectifiers;
second oscillator means having an output connected to the gate of said third controlled rectifier, one of said output windings being coupled to said second oscillator means for delivering synchronizing control signals to said second oscillator means;
rectifier means connected to another of said output windings;
filter means connected to the output of said rectifier means;
output means;
voltage control means;
current control means connected between said filter means and said output means; and
means for connecting said voltage control means and said current control means to said second oscillator means for controlling the phase of the output pulse from said second oscillator means relative to said synchronizing control signals thereby controlling said third controlled rectifier to commutate said first and said second controlled rectifiers.

3. A regulated power source comprising:
direct current input means;
a transformer having a primary winding and a plurality of output windings;
a first, a second and a third controlled rectifier each having a cathode, an anode and a gate, said first and said second rectifiers having their cathodes connected to said primary windings;
an inductance connected between said direct current input means and the anodes of each of said controlled rectifiers;
a first commutating capacitor connected between the cathodes of said first and third controlled rectifiers;
a second commutating capacitor connected between the cathodes of said second and said third controlled rectifiers;
first oscillator means connected to the gates and cathodes of said first and said second controlled rectifiers;
second oscillator means including a frequency controlling capacitor and having an output connected to the gate and cathode of said third controlled rectifier, one of said output windings being coupled to said second oscillator means for delivering synchronizing control signals thereto;
rectifier means connected to another of said output windings;
filter means connected to the output of said rectifier means;
output means;
voltage control means coupled to said filter means;
current control means connected between said filter means and said output means; and
means for connecting said voltage control means and said current control means to said second oscillator means for controlling the phase of the output signals from said second oscillator means relative to said synchronizing control signals thereby controlling said third controlled rectifier to control the duration of the pulses generated by said first and said second controlled rectifiers, said connecting means including a transistor having at least a first, a second and a third electrode, the first of said electrodes being connected to said voltage control means, the second of said electrodes being connected to said frequency controlling capacitor and rectifier means connecting the third of said electrodes to one of said output windings.

4. A regulated power source comprising:
direct current input means;
a transformer having a primary winding and a plurality of output windings;
a first and a second controlled rectifier each having a cathode connected to said primary winding, an anode and a gate;
a third controlled rectifier including a cathode, an anode and a gate;
an inductance connected between said direct current input means and the anodes of said controlled rectifiers;
a first commutating capacitor connected between the cathodes of said first and third controlled rectifiers;
a second commutating capacitor connected between the cathodes of said second and said third controlled rectifiers;
first oscillator means connected to the gates and cathodes of said first and said second controlled rectifiers;
second oscillator means having an output connected to the gate and cathode of said third controlled rectifier, one of said output windings being coupled to said second oscillator means for delivering synchronizing control signals to said second oscillator means;
rectifier means connected to another of said output windings;
filter means connected to the output of said rectifier means;
output means;
voltage control means;
current control means connected between said filter means and said output means;
means for connecting said voltage control means and said current control means to said second oscillator means for controlling the phase of the output pulse from said second oscillator means relative to said synchronizing control signals thereby controlling said third controlled rectifier to control the duration of the pulses generated by said first and said second controlled rectifiers; and switch means coupled to one of said output windings and to said connecting means for by-passing signals from said current control means and said voltage control means for a predetermined interval whereby said second oscillator means delivers control pulses to said third controlled rectifier gate which pulses are advanced in phase during said predetermined period.

5. In an electrical system, the combination comprising:
- electrical condition responsive means;
- phase control oscillator means including a transistor having a first, a second and a third electrode;
- a frequency controlling capacitor having one electrode connected to one electrode of said transistor;
- transformer means including a primary winding connected between said second transistor electrode and the other of said capacitor electrodes and a secondary winding;
- a current source;
- semi-conductor current control means coupled between said electrical condition responsive means, said current source and said capacitor;
- controlled rectifier means including a commutating controlled rectifier having cathode, anode and gate electrodes, said secondary winding being coupled to two electrodes of said commutating rectifier; and
- switch means including a semi-conductor having three electrodes, one of said semi-conductor electrodes being connected to said current control means, another of said semi-conductor electrodes being connected to the other electrode of said capacitor, the third of said electrodes being coupled to said controlled rectifier means.

6. In a variable pulse width parallel inverter having output terminals and including a pair of controlled rectifiers having their anodes connected together, a transformer having a primary winding connected between the cathodes of said pair of rectifiers and a commutating controlled rectifier coupled to said pair of rectifiers, the combination comprising:
- an oscillator including a first semi-conductor device having at least three electrodes, a second transformer having a primary and a secondary winding, and a capacitor, said primary winding connecting one electrode of said capacitor to one electrode of said device, the other electrode of said capacitor being connected to another electrode of said device, said second transformer being connected to two electrodes of said commutating controlled rectifier, said first semi-conductor device being coupled to said second transformer;
- a second semi-conductor device including at least three electrodes, two of which are connected to different electrodes of said capacitor;
- synchronizing means coupled to the third electrode of said second semi-conductor device including biasing means normally maintaining said second semi-conductor device in a conducting condition;
- a current source;
- a third semi-conductor device including at least three electrodes, one of which is coupled to said source;
- resistance means coupling another of said third device electrodes to said source and to one electrode of said capacitor; and
- input means coupled between said inverter output terminals and said third electrode of said third device whereby signals applied to said input means controls the charging rate of said capacitor and thereby controls the frequency of said oscillator.

7. In an electrical system, the combination comprising:
- an oscillator including a semi-conductor device and a capacitor connected to said device to control the frequency of oscillations;
- semi-conductor means coupled to said capacitor for controlling the start of the charging of said capacitor;
- second semi-conductor means coupled to said capacitor to control the charging rate thereof;
- first input means coupled to said second semi-conductor means for controlling the resistance of said second semi-conductor means; and
- third semi-conductor means coupled to said first input means for by-passing control signals from said second semi-conductor means for a predetermined period.

8. In an electrical system, the combination comprising:
- a pair of power semi-conductors, each including a gate electrode;
- output means coupling two electrodes of said semi-conductors;
- a pair of commutating capacitors connected in series between one electrode of each of said semi-conductors;
- a commutating semi-conductor connected intermediate said capacitors and connected to the one electrode of each of said power semi-conductors and including a gate electrode;
- oscillator means coupled to said gate electrode of said commutating semi-conductor and including a semi-conductor device and a frequency controlling capacitor connected to said device;
- charging rate control means coupled to said capacitor including a semi-conductor, resistance means serially connected to said capacitor and said last-mentioned semi-conductor, resistance means connected in parallel with said last-mentioned semi-conductor and signal means coupled to said last-mentioned semi-conductor for controlling the resistance thereof; and
- semi-conductor means for normally short circuiting said capacitor including means for rendering said semi-conductor means non-conducting to start the charging of said capacitor.

9. In a regulated power supply employing a pair of controlled power semi-conductor rectifiers connected with their cathode-anode paths between opposite terminals of a source of potential and opposite output terminals, the combination comprising:
- a pair of serially connected commutating capacitors each having one electrode connected to the cathode-anode path of one of said controlled rectifiers;
- a commutating controlled rectifier having a cathode, an anode and a gate electrode, said commutating rectifier cathode being connected intermediate said pair of capacitors, said commutating rectifier anode being connected to said pair of controlled rectifiers;
- pulse generator means for alternately applying pulses between two electrodes of said pair of controlled rectifiers, said pulse generator means including a transformer having a primary winding and a plurality of output windings and a pair of transistors, each having one electrode connected to said primary winding and each having two other electrodes connected to the second of said plurality of output windings, each of two of said output windings being coupled to two electrodes of said pair of controlled rectifiers; and
- frequency control means including an oscillator, a reference voltage device coupled to said oscillator and means coupling the output of said oscillator to one electrode of each of said pair of transistors.

10. In a control system, the combination comprising:
- an oscillator including a semi-conductor and a capacitor coupled to two electrodes of said semi-conductor;
- a capacitor charging circuit including a semi-conductor having at least three electrodes, resistance means coupled between two of said three electrodes, resistance means coupling one of said three electrodes to said capacitor and input terminal means coupled to one of said three electrodes; and semi-conductor by-pass means coupled to said input terminal means for by-passing signals from said input terminal means and including a third semi-conductor having one electrode connected to said input terminal means, start signal input means and time delay means coupled between said start signal input means and said third semi-conductor whereby said third semi-conductor by-passes signals from said input terminals for a predetermined period after said system is started, said period being determined by said time delay means.

References Cited

UNITED STATES PATENTS

| | | | |
|---|---|---|---|
| 3,315,146 | 4/1967 | Paice | 321—45 |
| 2,991,410 | 7/1961 | Seike | 321—2 X |
| 3,075,136 | 1/1963 | Jones | 321—16 X |
| 3,129,380 | 4/1964 | Lichowsky | 323—22 |
| 3,151,288 | 9/1964 | Avizienes et al. | 323—22 |
| 3,197,691 | 7/1965 | Gilbert | 321—18 |
| 3,229,191 | 1/1966 | Williamson | 321—45 |
| 3,249,838 | 5/1966 | Mierendorf | 318—257 |
| 3,263,153 | 7/1966 | Lawn | 321—45 |

JOHN F. COUCH, *Primary Examiner.*

W. H. BEHA, JR., *Assistant Examiner.*